(12) United States Patent
Sophiea

(10) Patent No.: US 9,475,972 B2
(45) Date of Patent: Oct. 25, 2016

(54) ADHESIVE USEFUL FOR INSTALLING VEHICLE WINDOWS

(71) Applicant: DOW GLOBAL TECHNOLOGIES LLC, Midland, MI (US)

(72) Inventor: Daniel P. Sophiea, Lake Orion, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 14/442,931

(22) PCT Filed: Mar. 8, 2013

(86) PCT No.: PCT/US2013/029872
§ 371 (c)(1),
(2) Date: May 14, 2015

(87) PCT Pub. No.: WO2014/098938
PCT Pub. Date: Jun. 26, 2014

(65) Prior Publication Data
US 2015/0291863 A1    Oct. 15, 2015

Related U.S. Application Data

(60) Provisional application No. 61/740,922, filed on Dec. 21, 2012.

(51) Int. Cl.
| | |
|---|---|
| *B29C 65/48* | (2006.01) |
| *B29K 75/00* | (2006.01) |
| *B29K 507/04* | (2006.01) |
| *B29K 509/00* | (2006.01) |
| *B29K 709/08* | (2006.01) |
| *B29L 11/00* | (2006.01) |
| *B29L 31/30* | (2006.01) |
| *C08G 18/12* | (2006.01) |
| *C08G 18/28* | (2006.01) |
| *C08G 18/48* | (2006.01) |
| *C08G 18/72* | (2006.01) |
| *C08G 18/76* | (2006.01) |
| *C08G 18/79* | (2006.01) |
| *C08K 3/04* | (2006.01) |
| *C08K 3/34* | (2006.01) |
| *C08K 5/12* | (2006.01) |
| *C08K 5/357* | (2006.01) |
| *C08K 5/52* | (2006.01) |
| *C08L 9/02* | (2006.01) |
| *C09J 175/06* | (2006.01) |
| *C09J 175/08* | (2006.01) |

(52) U.S. Cl.
CPC ............ *C09J 175/06* (2013.01); *B29C 65/485* (2013.01); *B29C 65/4885* (2013.01); *C08G 18/12* (2013.01); *C08G 18/289* (2013.01); *C08G 18/4812* (2013.01); *C08G 18/4825* (2013.01); *C08G 18/4829* (2013.01); *C08G 18/725* (2013.01); *C08G 18/7671* (2013.01); *C08G 18/792* (2013.01); *C08K 3/04* (2013.01); *C08K 3/346* (2013.01); *C08K 5/12* (2013.01); *C08K 5/357* (2013.01); *C08K 5/52* (2013.01); *C08L 9/02* (2013.01); *C09J 175/08* (2013.01); *B29K 2075/00* (2013.01); *B29K 2507/04* (2013.01); *B29K 2509/00* (2013.01); *B29K 2709/08* (2013.01); *B29L 2011/00* (2013.01); *B29L 2031/30* (2013.01); *C09J 2475/003* (2013.01)

(58) Field of Classification Search
CPC .......... C08G 18/4825; C08G 18/4829; C08G 18/725; C08G 18/7671; C08G 18/792; C08G 18/12; C08G 18/289; C08G 18/4812; C08K 3/04; C08K 3/346; C08K 5/12; C08K 5/357; C08K 5/52; C08L 9/02; C09J 175/06; C09J 175/08; C09J 2475/003; B29C 65/485; B29C 65/4885; B29K 2075/00; B29K 2507/04; B29K 2509/00; B29K 2709/08; B29L 2011/00; B29L 2031/30
See application file for complete search history.

(56) References Cited

U.S. PATENT DOCUMENTS

| | | | |
|---|---|---|---|
| 3,707,521 | A | 12/1972 | De Santis |
| 3,779,794 | A | 12/1973 | De Santis |
| 4,025,477 | A | 5/1977 | Borden et al. |
| 4,374,237 | A | 2/1983 | Berger et al. |
| 4,525,511 | A | 6/1985 | Kirby et al. |

(Continued)

FOREIGN PATENT DOCUMENTS

| | | |
|---|---|---|
| CA | 1011756 | 6/1977 |
| EP | 0364738 B1 | 8/1994 |

(Continued)

OTHER PUBLICATIONS

International Search Report and Written Opinion dated Sep. 3, 2013, PCT/US2013/029872.

(Continued)

*Primary Examiner* — Patrick Niland
(74) *Attorney, Agent, or Firm* — The Dobrusin Law Firm, P.C.; Norman L. Sims

(57) ABSTRACT

The invention is a composition comprising: a) one or mote isocyanate functional polyether based prepolymers; b) one or more alkyl esters of one or more long chain; fatty acids; and c) one or more catalysts for the reaction of isocyanate moieties with hydroxyl, groups. The invention is s method, of bonding two or more substrates together which comprises contacting the two or more substrates together with a composition according to this invention disposed along at least a portion of the area wherein the substrates are in contact.

20 Claims, No Drawings

(56) References Cited

U.S. PATENT DOCUMENTS

| | | |
|---|---|---|
| 4,538,920 A | 9/1985 | Drake |
| 4,625,012 A | 11/1986 | Rizk et al. |
| 4,780,520 A | 10/1988 | Rizk et al. |
| 5,082,147 A | 1/1992 | Jacobs |
| 5,623,044 A | 4/1997 | Chiao |
| 5,922,809 A | 7/1999 | Bhat et al. |
| 5,976,305 A | 11/1999 | Bhat et al. |
| 6,015,475 A | 1/2000 | Hsieh et al. |
| 6,512,033 B1 | 1/2003 | Wu |
| 6,709,539 B2 | 3/2004 | Zhou |
| 2002/0100550 A1 | 8/2002 | Mahdi et al. |

FOREIGN PATENT DOCUMENTS

| | | | |
|---|---|---|---|
| EP | 1260548 | * | 11/2002 |
| WO | 2011/013815 A1 | | 2/2011 |

OTHER PUBLICATIONS

Written Opinion of International Preliminary Examining Authority, dated Dec. 15, 2014, PCT/US2013/029872.
International Preliminary Report on Patentability, dated Apr. 8, 2015, PCT/US2013/029872.
Material Safety Data Sheet, SoyGold 1000 Solvent dated Jul. 14, 2009, 2 pages.
Technical Data Sheet, SoyGold, SG1000-Industrial Solvent, Copyright 2011 by Ag Environmental Products, L.L.C., 1 page.
Zlatanic, et al., Effect of Structure on Properties of Polyols and Polyurethanes Based on Different Vegetable Oils, dated Sep. 16, 2003, 11 pages.

* cited by examiner

ADHESIVE USEFUL FOR INSTALLING VEHICLE WINDOWS

CLAIM OF PRIORITY

This application is a national phase filing under 35 USC §371 from PCT Application serial number PCT2013/029872 filed on Mar. 8, 2013, and claims priority therefrom. This application further claims priority from U.S. Provisional Application Ser. No. 61/740,922 filed Dec. 21, 2012 both incorporated herein by reference.

FIELD OF INVENTION

The invention relates to a composition useful as an adhesive and a method of bonding two or more substrates together using the composition, wherein such substrates may include glass, plastics, composites, coated metals for use in buildings and vehicles. The composition can be utilized for replacing a window in a vehicle.

BACKGROUND OF INVENTION

Adhesive compositions are used to bond glass (windows) into building and vehicles, see Rizk, U.S. Pat. No. 4,780,520; Bhat, U.S. Pat. No. 5,976,305; Hsieh et al, U.S. Pat. No. 6,015,475 and Zhou, U.S. Pat. No. 6,709,539, all incorporated herein by reference. In automobile factories windows are installed using robots and computer controlled processing which facilitates the use of a variety of high performance adhesives, for instance nonconductive adhesives and high modulus adhesives. The speed of cure is not a significant issue because new vehicles are not driven a significant distance for several days after window installation. When a vehicle needs a window replaced, it is often performed in a remote location by an installer working at the vehicle to be repaired. In this environment, speed of cure is important as the vehicle owner desires to drive the vehicle as soon as possible after installation of the window. Adhesives useful in replacing windows for vehicles which facilitate fast drive away times are known as Bhat, U.S. Pat. No. 5,976,305 and Zhou, U.S. Pat. No. 6,709,539. The introduction of various high performance adhesive compositions used for installing windows in automobile factories presents a problem for replacement window installers. First, adhesives that meet all the varied performance requirements are not available in the market place. Second, it is difficult to formulate many high performance adhesive compositions to allow rapid drive away times that do not sag or string. Sag is the loss of the shape of the adhesive bead, often as the result of gravitational forces. If severe enough, this, deformation can interfere in the proper installation and sealing of the window on the vehicle. Stringing of an adhesive is the formation of a long string of adhesive at the end of the bead after dispensing which can complicate application and cause imperfections in the installed adhesive bead. Replacement window installers often carry a variety of adhesives to match the adhesive to the properties of the original adhesive used.

Isocyanate functional adhesives are utilized for bonding glass into structures and contain plasticizers to adjust the rheology and dispensability of these adhesives. Typically, plasticizers used in isocyanate functional adhesives were adopted initially from plasticizers developed for use in polyvinyl chloride plastisol compositions because of their cost and availability. One common class of plasticizers used in isocyanate functional adhesives are alkyl phathates. Such compounds, to date, have been available and cost effective. Recently, however, EH&S concerns have been raised about these materials negatively impacting the cost and availability. There is a need to find new plasticizers for isocyanate functional adhesives.

What is needed is a composition which is useful as an adhesive for bonding glass into a structure which may be formulated to exhibit a variety of high performance properties (such as high modulus and nonconductive nature), exhibits fast safe drive way times when applied under a variety of conditions, fast strength development, can be applied without the need for heating the adhesive, can be applied under a wide range of environmental conditions, does not requite expensive ingredients, can be applied to glass without the need for a primer and does not sag or string when applied. Compositions containing plasticizers adapted for use with isocyanate functional adhesives having low viscosities, desirable polarity, high boiling points, low volatility, derived from renewable resources are needed.

SUMMARY OF INVENTION

We have discovered plasticizers derived from renewable sources that have or one or more of the following: a polarity to form homogeneous blends with an isocyanate adhesive; low water content preventing premature curing of such adhesives; low viscosities to facilitate adhesive formulation flexibility including, for example, higher filler concentrations and lower dispensing pressures; and high boiling points to prevent release of volatile organics to the environment.

In one embodiment, the invention is a composition comprising: a) one or more isocyanate functional components; b) a blend of one or more $C_{1-8}$ alkyl esters of $C_{10-20}$ alkenoates, wherein the total carbon atoms of the alkenoates is from 11 to 22, and one or more $C_{1-8}$ alkyl esters of $C_{10-20}$ alkanoates, wherein the total carbon atoms of the alkanoates is from 11 to 22; and c) one or more catalysts for the reaction of isocyanate moieties with hydroxyl groups. Preferably the alkyl esters of alkenoates exhibit a melting point of about $-10°$ C. or less and one or more alkyl esters of alkanoates exhibit a melting point of about $30°$ C. or greater. Preferably the blend exhibits a dielectric constant of 6.5 or greater, a boiling point of $200°$ C. or greater, a viscosity of about 40 centpoise or less at $25°$ C. and a vapor pressure of about 1 MPa or less at $25°$ C. Preferably the blend of one or more alkyl esters of alkenoates and one or more alkyl esters of alkanoates are derived from one or more natural oils, exemplary natural oils include soy, sunflower, safflower, rapeseed and cottonseed oils. Preferably one or more carbon blacks are present in the composition.

In another embodiment the invention is a method of bonding two or more substrates together comprising contacting two or more substrates together with a composition of this invention disposed along at least a portion of the area wherein the substrates are in contact.

In yet another embodiment the invention is a method of replacing a window of a vehicle comprising: i) removing the window from the vehicle; ii) applying a composition according to the invention to a replacement window or to the flange of the vehicle adapted to hold the window into the vehicle; iii) contacting the flange of the vehicle and the replacement window with the composition disclosed between the replacement window and the flange of the vehicle; and iv) allowing the adhesive to cure.

The composition is useful as an adhesive to bond substrates together. A variety of substrates, similar or dissimilar, may be bonded together using the composition, for instance, plastics, glass, wood, ceramics, metal, coated substances, such as plastics with an abrasion resistant coating disposed thereon, and the like. The compositions are especially useful for bonding glass or a plastic with an abrasion resistant coating disposed thereon to other substrates such as vehicles and buildings. The compositions are also useful in bonding parts of modular components together, such as vehicle modular components. The glass or plastic with an abrasion resistant coating disposed thereon can be bonded to coated and uncoated portions of vehicles.

The compositions typically demonstrate, after being cured for two weeks, a modulus of about 2.0 MPa or greater, preferably about 2.5 MPa or greater and typically about 5.0 MPa or less according to ASTM D4065 measured at 25° C. The compositions of the invention typically exhibit a storage modulus, G', of about $1 \times 10^6$ MPa or greater, preferably about $1.3 \times 10^6$ MPa or greater and most preferably about $1.8 \times 10^6$ MPa or greater after being fully cured, for instance for 7 days at 25° C./50 percent relative humidity.

The composition's pumpability may be indicated by measuring the press flow viscosity according to the test described herein and preferably exhibit a press flow viscosity of about 25 to about 100 seconds, most preferably about 25 to about 50 seconds. The compositions allow preparation of adhesives with a reduced filler level and an acceptable modulus in the uncured state (G-Modulus), that is the compositions maintain the modulus at reduced filler levels.

DETAILED DESCRIPTION OF INVENTION

One or more as used herein means that at least one, or more than one, of the recited components may be used as disclosed. Nominal as used with respect to functionality means the theoretical functionality, which can be calculated from the stoichiometry of the ingredients used. Generally, the actual functionality is different due to imperfections in raw materials, incomplete conversion of the reactants and formation of by-products. "Durability" in herein means that the composition once cured remains sufficiently strong to perform its designed function, in the embodiment wherein the cured composition is an adhesive the adhesive holds substrates together, for the life or most of the life of the structure containing the cured composition. As an indicator of this durability the curable composition (e.g. adhesive) preferably exhibits excellent results during accelerated aging testing as described herein. Preferably this means that after a set of substrates bonded with the adhesive of the invention is exposed to heat aging, the failure mode in Quick Knife adhesion or Lap Shear testing is cohesive, meaning the adhesive breaks before the bond of the adhesive to the substrate breaks. "Isocyanate content" means the weight percentage of isocyanate moieties based on the total weight of the prepolymer. The term "isocyanate-reactive compound" as used herein includes any organic compound having nominally at least two isocyanate-reactive moieties. For the purposes of this invention, isocyanate-reactive moieties include active hydrogen containing moieties and preferably refer to moieties containing a hydrogen atom which, because of its position in the molecule, displays significant activity according to the Zerewitinoff test described by Wohler in the Journal of the American Chemical Society, Vol. 49, p. 3181 (1927). Isocyanate reactive moieties include —COOH, —OH, —NH$_2$, —CONH$_2$, —SH, and —CONH—. Preferable isocyanate reactive moiety containing compounds include polyols, poly-amines, polymercaptans and polyacid, more preferably polyols, and most preferably a polyether polyols.

The compositions invention can be any reactive system containing isocyanate functional components which are curable. "Reactive" means herein that the curable composition (e.g. adhesive) contains components which react to form a polymeric matrix that is set irreversibly once cured. The curable systems can be either one or two-part systems. Preferably the curable systems are useful as adhesives.

Isocyanate based (polyurethane or polyurea forming) curable systems comprise an isocyanate functional component. An isocyanate functional component contains one or more compounds having on average more than one isocyanate group per molecule. The isocyanate functional compound can be any compound which contains on average more than one isocyanate moiety. The isocyanate functional compound can be in the form of an isocyanate functional prepolymer or in the form of a monomer or oligomer having on average greater than 1 isocyanate group, and preferably 2 or more isocyanate groups. The isocyanate prepolymer can be any prepolymer prepared by reaction of an isocyanate functional compound with one or more compounds having on average more than one isocyanate reactive functional groups, such as hydroxyl, amine, thiol, carboxyl and the like, under conditions such that the prepolymer prepared have on average more than one isocyanate moiety (group) per molecule. Preferably the compounds having isocyanate reactive groups have on average about 2 to about 4 isocyanate reactive groups. The isocyanate functional component is present in the curable composition in a sufficient amount to form a cured component when exposed to curing conditions. In two-part adhesive compositions, the isocyanate functional components when combined with isocyanate reactive compounds are capable of bonding substrates together in a manner that the substrates remain bound together when exposed to temperatures of about −30° C. to about 100° C. for long periods of time, such as 10 years; and up to temperatures of about 180° C. for short periods of up to 30 minutes.

In a one-part system, the isocyanate functional component further comprises a catalyst and other components as described hereinafter. The one component adhesive systems typically cure by moisture curing. Once formulated the one-part adhesive systems are generally packaged in air and moisture proof containers to prevent curing before application.

The curable system may be a two-part polyisocyaoate containing curable system. The two parts are reactive with one another and when contacted undergo a curing reaction. One part of the composition comprises, or contains, an isocyanate functional component, typically referred to as the resin-side or A side. The other component of the composition is an isocyanate reactive component which comprises, or contains, one or more compounds, oligomers or prepolymers having on average more than one group reactive with isocyanate moieties as described herein, commonly known as the curative or B side. Compounds having on average one or more isocyanate reactive groups can be prepolymers or can be small chain compounds such as difunctional chain extenders or polyfunctional crosslinking agents known in the art. A catalyst as described herein may be utilized in the curative side. The reaction product is a cured product which is capable of performing the desired function, such as bonding certain substrates together.

The isocyanate functional components, such as isocyanate functional prepolymers, are present in sufficient quantity to provide adhesive character to the composition. Such isocyanate functional components have an average isocyanate functionality sufficient to allow the preparation of a crosslinked polyurethane upon cure and not so high that the curable compositions are unstable. Stability in this context means that the isocyanate functional components or adhesive prepared from the isocyanate functional components have a shelf life of at least 6 months at ambient temperatures, in that it does not demonstrate an increase in viscosity during such period which prevents its application or use. Preferably, it does not undergo an increase in viscosity of more than about 50 percent during the stated period. The isocyanate functional components preferably have a free isocyanate content which facilitates acceptable strength in adhesives prepared therefrom after 60 minutes and stability of the curable composition. The isocyanate functional components preferably have a free isocyanate content which facilitates acceptable strength in the compositions prepared therefrom, preferably after 30 minutes, more preferably after 15 minutes. In one component adhesives, the free isocyanate content is about 0.8 percent by weight or greater based on the weight of the prepolymer and more preferably about 0.9 percent by weight or greater, and preferably about 2.2 percent by weight or less, more preferably about 2.0 or less, even more preferably about 1.4 percent by weight or less and even more preferably about 1.1 percent by weight or less and most preferably about 1.0 percent by weight or less. In two part compositions the isocyanate content in the isocyanate functional components is preferably about 1 percent by weight or greater based on the weight of the isocyanate functional components, more preferably about 2 percent by weight or greater, even more preferably about 6 percent or greater, even more preferably about 8 percent by weight or greater and most preferably about 10 percent by weight or greater. The isocyanate content in the isocyanate functional components of two part compositions is preferably about 35 percent by weight or less based on the weight of the isocyanate functional components, more preferably about 25 percent by weight or less, even more preferably about 20 percent by weight and most preferably about 15 percent by weight or less.

Preferable polyisocyanates for use in preparing the isocyanate functional components include those disclosed in U.S. Pat. No. 5,922,809 at column 3, line 32 to column 4, line 24 incorporated herein by reference. Preferably, the polyisocyanate is an aromatic or cycloaliphatic polyisocyanate such as diphenylmethane-4,4'-diisocyanate isophorone diisocyanate, tetramethylxylene diisocyanate, and is most preferably diphenylmethane-4,4'-diisocyanate. The polyols reacted with the polyisocyanates preferably comprise one or more polyols having from about 2 to about 4 hydroxyl groups, and are preferably a mixture of diols and triols. Polyols useful in this invention are diols and triols corresponding to the polyols described in U.S. Pat. No. 5,922,809 at column 4, line 60 to column 5, line 50, incorporated herein by reference. Preferably, the polyols (diols and triols) are polyether polyols and more preferably polyoxyalklene oxide polyols. The most preferred triols are ethylene oxide-capped polyols prepared by reacting glycerin with propylene oxide, followed by reacting the product with ethylene oxide.

In one preferred embodiment the isocyanate functional prepolymer contains one or more organic based polymer-particles dispersed therein or grafted to the backbone thereof. Preferably, the organic based polymer particle is included in the prepolymer by inclusion of a triol having dispersed therein or grafted to the backbone particles of an organic based polymer. The preferable triols are disclosed in Zhou, U.S. Pat. No. 6,709,539 at column 4, line 13 to column 6, line 18, incorporated herein by reference. Preferably, the triol is a polyether triol and more preferably a polyoxyalkylene based triol. Preferably, such polyoxyalkylene oxide triol comprises a polyoxypropylene chain with a polyoxyethylene end cap. Preferably, the organic based polymer particles comprise a thermoplastic polymer, rubber-modified thermoplastic polymer or a polyurea dispersed in a triol. Preferable thermoplastic polymers are those based on monovinylidene aromatic monomers and copolymers of monovinylidene aromatic monomers with conjugated dienes, acrylates, methacrylates, unsaturated nitriles or mixtures thereof. The copolymers can be block or random copolymers. More preferably the particles comprise copolymers of unsaturated nitriles, conjugated dienes and a monovinylidene aromatic monomer, a copolymer of an unsaturated nitrile and a monovinylidene aromatic monomer or a polyurea, even more preferably a polyurea or polystyrene-acrylonitrile copolymer with the polystyrene-acrylonitrile copolymers being most preferred. The organic polymer particles preferably have a particle size which is large enough to improve the impact properties and elastomeric properties of the finally cured adhesive, but not so large so as to reduce the ultimate strength of the adhesive after cure. Preferably, the particle size is about 10 microns or greater and more preferably the particle size is about 20 microns or greater. Preferably, the particle size is about 50 microns or less and more preferably the particle size is about 40 microns or less. The triol contains a sufficient amount of organic polymer particles such that the adhesive upon cure has sufficient hardness for the desired use and not so much such that the cured adhesive has too much elasticity as defined by elongation. Preferably, the polyols contain about 20 percent by weight or greater of organic polymer particles copolymer based on the polyols and particles, preferably about 30 percent by weight or greater and more preferably about 35 percent by weight or greater. Preferably, the polyols contain about 60 percent by weight or less of organic polymer particles based on the polyols and particles, preferably about 50 percent by weight or less and more preferably about 45 percent by weight or less. The polyols containing organic polymer particles in a triol may be present in the prepolymer in an amount of about 10 percent by weight or greater of the prepolymer and more preferably about 12 percent by weight or greater, and about 18 percent by weight or less of the prepolymer.

The polyols are present in an amount sufficient to react with most of the isocyanate groups leaving enough isocyanate groups to correspond with the desired free isocyanate content of the isocyanate functional component. Preferably, the polyols are present in an amount of about 30 percent by weight or greater based on the prepolymer, more preferably about 40 percent by weight or greater and most preferably about 55 percent by weight or greater. Preferably, the polyols are present in an amount of about 75 percent by weight or less based on the prepolymer, more preferably about 65 percent by weight or less and most preferably about 60 percent by weight or less.

The isocyanate functional component may further comprise, a blend of one or more $C_{1-2}$ alkyl esters of $C_{16-20}$ alkenoates and one or more $C_{1-2}$ alkyl esters of $C_{16-20}$ alkanoates; one or more common plasticizers or mixtures thereof. The plasticizers useful in the isocyanate functional component are common plasticizers useful in polyurethane adhesive applications and well known to those skilled in the art. The plastcizers are present in an amount sufficient to disperse the isocyanate functional component in the final adhesive composition. The plasticizers can be added to the adhesive either during preparation of an isocyanate functional component or during compounding of the adhesive composition. Preferably, the plasticizers are present in about 1 percent by weight or greater of the isocyanate functional component formulation (for example prepolymer plus plasticizer), more preferably about 20 percent by weight or greater and most preferably about 30 percent by weight or greater. Preferably, the plasticizer is present in about 45 percent by weight or less of the isocyanate functional component formulation and more preferably about 35 percent by weight or less.

The isocyanate functional components prepolymers may be prepared by any suitable method, such as by reacting polyols with an excess over stoichiometry of one or more polyisocyanates under reaction conditions sufficient to form a prepolymer having isocyanate functionality and free isocyanate content which meets the criteria discussed above. Preferable processes for the preparation of the isocyanate functional components are disclosed in U.S. Pat. No. 5,922,809 at column 9, lines 4 to 51 incorporated herein by reference. The isocyanate functional components are present in the adhesive composition in an amount sufficient such that when the resulting adhesive cures substrates are bound together. Preferably, the isocyanate functional components are present in an amount of about 20 parts by weight of the adhesive composition or greater, more preferably about 30 parts by weight or greater and most preferably about 35 parts by weight or greater. Preferably, the isocyanate functional components are present in an amount of about 60 parts by weight of the adhesive composition or less, more preferably about 50 parts by weight or less and even more preferably about 45 parts by weight or less.

The composition of the invention comprises a blend of one or more $C_{1-8}$ alkyl esters of $C_{10-20}$ alkenoates, wherein the total carbon atoms of the alkenoates is from 11 to 22, and one or more $C_{1-8}$ alkyl esters of $C_{10-20}$ alkanoates wherein the total carbon atoms of the alkanoates is from 11 to 22. Any a blend of one or more alkyl esters of alkenoates and one or more alkyl esters of alkanoates; that enhance the rheology and applicability of the compositions may be utilized in the compositions. Preferably the blends exhibit a polarity sufficient to form homogeneous blends with the components of the isocyanate functional adhesive. Preferably, the blend has a sufficiently low water content such that the adhesive does not cure during storage, that is the stored formulations are stable as discussed herein. Preferably the water content is about 0.07 percent by weight or less and more preferably about 0.05 weight percent or less.

Preferably the blend exhibits a sufficient low viscosity such that the formulations of the invention can be pumped and applied, preferably at temperatures from 15 to 35° C., particularly with standard application equipment used in original equipment manufacture and in glass replacement processes. Preferably the viscosity of the blend is such that the isocyanate functional adhesive composition is applicable using standard equipment. Preferably the viscosity of the blend is about 100 centipoise or less at 25° C. and most preferably about 60 centipoise or less at 25° C. Preferably the viscosity of the blend is about 40 centipoise at 25° C. and most preferably about 20 centipoise at 25° C.

The blend desirably exhibits a sufficiently high boiling point such that the components of the blend do not volatilize into the environment during application and use. The blend exhibits a boiling point such that the evolution of volatile organics is very low below 0.5 percent by weight or unmeasurable, measured using EPA Method 24B, and preferably is about 160° C. or greater, more preferably about 200° C. or greater and most preferably about 220° C. or greater. Preferably the vapor pressure of the blend is about 0.001 kPa or less at 25° C. and most preferably about 0.01 kPa or less at 25° C. Desirably, the blend exhibits a dielectric constant to achieve the desired polarity, preferably about 6.5 or greater and most preferably about 7.0 or greater.

The one or more $C_{1-2}$ alkyl esters of $C_{16-20}$ alkenoates preferably correspond to the formula $R^1$—C(O)$OR^2$ wherein $R^1$ is separately in each occurrence a $C_{16-20}$ alkenyl group and $R^2$ is separately in each occurrence a $C_{1-8}$ alkyl group wherein the total carbon atoms of $R^1$ and $R^2$ is from 11 to 22 and is preferably from 16 to 20. Alkenyl group as used in this context is a straight or branched carbon chain containing one or more double bonds. Preferably the carbon chains contain from one to three double bonds and preferably one or two double bonds. Most preferably the $C_{1-2}$ alkyl esters of $C_{16-20}$ alkenoates are comprised of molecules having carbon chains with one double bond (mono-ene) or carbon chains with two double bonds (dienes). $R^1$ is separately in each occurrence a $C_{16-20}$ alkenyl group. Preferably $R^2$ is separately in each occurrence $C_{1-4}$ alkyl, more preferably methyl or ethyl and most preferably methyl. Preferably the alkyl esters of alkenoates comprise one or more $C_{1-4}$ alkyl esters of $C_{14-20}$ alkenoates, more preferably one or more $C_{1-4}$ alkyl esters of $C_{14-20}$ alkenoates and most preferably $C_{1-2}$ alkyl esters of $C_{16-20}$ alkenoates. The alkyl esters alkenoates may comprise both mon-enes and di-enes. The alkyl esters of alkenoates preferably exhibit low melting points and viscosities. Preferably the melting points are about −10° C. or below and more preferably about −20° C. or below. Preferably the viscosities are about 100 centipoise or less at 25° C. and most preferably about 50 centipoise or less at 25° C. Preferably the $C_{1-2}$ alkyl esters of $C_{16-20}$ alkenoates exhibit flash points such the blend does not release volatile organic compounds in use. Preferably the flash point is about 200° C. or less and most preferably about 160° C. or less. Exemplary $C_{1-2}$ alkyl esters of $C_{16-20}$ alkenoates include methyl cis 9-octadecenoate (also named methyl oleate and methyl ester of oleic acid) and methyl octadecadienoate (also named methyl linolelaidic ester), methyl ester of linolenic acid, methyl ester of gadoleic acid, methyl ester of civetic acid, and methyl ester of palmitoleic acid.

The one or more alkyl esters of alkanoates may be any such compounds that provide the desired properties of the blend described hereinbefore. Such compounds preferably raise the flash point of the blend to reduce the volatile organics from volatilizing off from the isocyanate functional adhesives during application, cure and use. The presence of such compounds maintains the dimension and shape of the bead of isocyanate functional adhesives applied to the substrate and prevents them from flowing when not subjected to shear. Preferably the alkyl esters of alkanoates are solid at 25° C. Preferably the alkyl esters of alkanoates exhibit a boiling point such that when present in the blend, the blend demonstrated reduced release of volatile organics. Preferably the boiling point is about 110° C. or greater, more preferably about 150° C. or greater, and more preferably about 200° C. or greater.

The one or more alkyl esters of alkanoates preferably correspond to the formula $R^3$—C(O)$OR^2$ wherein $R^1$ and $R^2$ are as described hereinbefore. More preferably $R^3$ is a $C_{16-18}$ alkyl group. Preferably the alkyl esters of alkanoates comprise one or more $C_{1-4}$ alkyl esters of $C_{14-20}$ alkanoates, more preferably one or more $C_{1-4}$ alkyl esters of $C_{14-20}$ alkanoates and most preferably $C_{1-2}$ alkyl esters of $C_{16-20}$ alkanoates. Exemplary alkyl esters of alkanoates include methyl hexadecanoate (also named methyl palmitate and palm oil methyl ester), methyl octadecanoate (also named methyl stearate and steric acid methyl ester), ethyl octadecanoate (ethyl stearate and steric acid ethyl ester), methyl ester of margaric acid, and methyl ester of archidic acid.

The blend comprises a sufficient amount of each of one or more alkyl esters of alkenoates and one or more alkyl esters of alkanoates to achieve the recited properties listed hereinbefore. Preferably the blend comprises about 70 percent by weight or greater of one or more alkyl esters of alkenoates based on the weight of the blend and more preferably about 80 percent by weight or greater based on the weight of the blend. Preferably the blend comprises about 90 percent by weight or less of one or more alkyl esters of alkenoates based on the weight of the blend and more preferably about 85 percent by weight or less based on the weight of the blend. Preferably the blend comprises about 5 percent by weight or greater of one or more alkyl esters of alkanoates based on the weight of the blend and more preferably about 10 percent by weight or greater based on the weight. Preferably the blend comprises about 20 percent by weight or less of one or more alkyl esters of alkanoates based on the weight of the blend and more preferably about 15 percent by weight or less based on the weight of the blend. The blend is utilized in sufficient amount to improve the processability and sag of the isocyanate functional adhesives. Preferably, the blend is present in the compositions of the invention in an amount of about 5 percent by weight or greater and most preferably about 10 percent by weight or greater. The blend is preferably present in an amount of about 35 percent by weight or less and most preferably about 25 percent by weight or less. The blend may be present in one or both parts of a two part composition, and preferably some is present in the A part.

The blend of the one or more alkyl esters of alkenoates and the one or more alkyl esters of alkanoates may be prepared by mixing the components or may be derived from natural oil compositions. In some embodiments they may be derived from natural oils. They may be derived from any source of natural oils that allow the one or more $C_{1-2}$ alkyl esters of $C_{16-20}$ alkenoates and one or more $C_{1-2}$ alkyl esters of $C_{16-20}$ alkanoates to perform the recited functions. Exemplary natural oils include soy, sunflower, safflower, rapeseed (canola), and mixtures thereof. More preferred natural oils include soy, sunflower, safflower, rapeseed oil (canola) and mixtures thereof with soy and canola oils being most preferred. The natural oils contain triglycerides. The triglycerides are converted to esters using an esterification processes, that is reacting the triglycerides with alcohols, such as methanol. Suitable processes include those well known in the art such as those used in biofuel production. Preferably the resulting products contain 95 mole percent or greater of ester groups and most preferably about 99 mole percent. A portion of the resulting acyl groups may be acids.

The compositions may comprise blend of the one or more alkyl esters of alkenoates and the one or more alkyl esters of alkanoates and common plasticizers. Such materials should be free of water, inert to isocyanate groups and compatible with isocyanate functional components. Exemplary common plasticizers include one or more of alkyl esters of sulfonic acid, alkyl alkylethers diesters, polyester resins, formate, polyglycol diesters, polymeric polyesters, tricarboxylic esters, dialkylether diesters, dialkylether aromatic esters, aromatic phosphate esters, and aromatic sulfonamides, aromatic diesters, aromatic triesters, aliphatic diesters, epoxidized esters, epoxidized oils, chlorinated hydrocarbons, aromatic oils, alkylether monoesters, naphthenic oils, alkyl monoesters, glyceride oils, paraffinic oils and silicone oils. Common plasticizers may be used in the adhesive composition in an amount of about 5 parts by weight or greater based on the weight of the adhesive composition, more preferably about 10 parts by weight or greater, and most preferably about 18 parts by weight or greater. The common plasticizers may be used in an amount of about 40 parts by weight or less based on the total amount of the adhesive composition, more preferably about 30 parts by weight or less and most preferably about 25 parts by weight or less.

The composition may comprise one or more isocyanate functional prepolymers containing one or more polyester based polyols which are solid at ambient temperature, about 23° C. The polyester based polyols have melting points such that the prepolymer provides sufficient green strength to prevent the substrates from moving in relation to one another due to gravitational forces at ambient temperatures. In terms of installing a window in a vehicle or building, the polyester based prepolymer prevents the window from sliding after installation. Preferably, the polyester polyols have melting points of about 40° C. or greater, even more preferably about 45° C. or greater and most preferably about 50° C. or greater. Preferably, the polyester polyols exhibit melting points of about 85° C. or less, even more preferably about 70° C. or less and most preferably about 60° C. or less. The polyester based isocyanate prepolymer can be prepared using one or more polyester polyols. The amount of polyester polyol in the prepolymer is a sufficient amount to provide the needed green to the composition of the invention and to render it solid at ambient temperatures. Preferably, the polyester polyol is present in the polyester polyol based isocyanate prepolymer in an amount of about 70 percent by weight or greater based on the weight of the prepolymer and more preferably about 80 percent by weight or greater. Preferably, the polyester polyol is present in the polyester polyol based isocyanate prepolymer in an amount of about 95 percent by weight or less based on the weight of the prepolymer and more preferably about 90 percent by weight or less. Preferably, the polyester polyol based isocyanate prepolymer is present in the adhesive composition in sufficient amount to give the needed green strength and the desired rheology of the composition. Preferably, the polyester polyol based isocyanate prepolymer is present in the adhesive composition in an amount of about 0 parts by weight or greater based on the weight of the adhesive composition, more preferably about 1 parts by weight or greater and most preferably about 2 parts by weight or greater. Preferably, the polyester polyol based isocyanate prepolymer is present in the adhesive composition in an amount of about 10 parts by weight or less, even more preferably about 5 parts by weight or less and most preferably about 2.5 parts by weight or less. The polyester polyol can be any polyester composition that meets the property requirements defined, which is crystalline at ambient temperatures and melts in the desired temperature range. Preferred polyester polyols are available from Creanova under the trade name Dynacol and the designations 7360 and 7330, with 7360 more preferred.

The composition may further comprise a polyfunctional isocyanate for the purpose of improving the modulus of the composition in the cured form. Polyfunctional as used in the context of the isocyanates refers to isocyanates having a functionality of 3 or greater and more preferably about 3.2 or greater. Preferably, the polyfunctional isocyanate has a nominal functionality of about 5 or less, even more preferably about 4.5 or less and most preferably about 4.2 or less. The polyfunctional isocyanate can be any isocyanate which is reactive with the isocyanate polyisocyanate prepolymers used in the composition and which improves the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation Desmodur® N3300, and polymeric isocyanates such as polymeric MDI (methylene diphenyl diisocyanates) such as those marketed by The Dow Chemical Company under the trademark of PAPI™, including PAPI™ 20 polymeric isocyanate. The polyfunctional isocyanates are present in sufficient amount to impact the modulus of the cured compositions of the invention. The polyfunctional isocyanate is preferably present in an amount of about 0.5 parts by weight or greater based on the weight of the adhesive composition, more preferably about 10 parts by weight or greater and most preferably about 1.4 parts by weight or greater. The polyfunctional isocyanate is preferably present in an amount of about 8 parts by weight or less, based on the weight of the adhesive composition, more preferably about 5 parts by weight or less and most preferably about 2 parts by weight or less.

The composition may comprise one or more reinforcing fillers. Such fillers are well known to those skilled in the art and include carbon black, titanium dioxide, calcium carbonate, surface treated silicas, titanium oxide, fumed silica, talc, and the like. Preferred reinforcing fillers comprise carbon black. More than one reinforcing filler may be used, preferably one is carbon black. The reinforcing fillers are used in sufficient amount to increase the strength of the adhesive, to provide thixotropic properties to the adhesive, and to give the composition the desired viscosity and sag resistance. Carbon black is commonly used to provide the desired black color. The carbon black used in this invention may be a standard carbon black which is not specially treated (surface treated or oxidized) to render it nonconductive. Alternatively one or more nonconductive carbon blacks may be used exclusively or in conjunction with the standard carbon black. The amount of carbon black in the composition is that amount which provides the desired color, viscosity, sag resistance and where nonconductivity is important in an amount such that the composition is nonconductive to the level defined herein. The reinforcing fillers are preferably used in the amount of about 10 parts by weight or greater based on the weight of the composition, more preferably about 12 parts by weight or greater and most preferably about 14 parts by weight or greater. Where non-conductive properties are desired, standard carbon black is preferably present in an amount of about 20 parts by weight or less based on the weight of the composition, more preferably about 18 parts by weight or less and most preferably about 16 parts by weight or less. The total reinforcing filler present, including conductive or standard and non-conductive carbon black, is preferably about 35 parts by weight or less based on the weight of the composition, more preferably about 30 parts by weight or less and most preferably about 20 parts by weight or less. Standard carbon blacks are well known in the art and include RAVEN™ 790, RAVEN™ 450, RAVEN™ 500, RAVEN™ 430, RAVEN™ 420 and RAVEN™ 410 carbon blacks available from Colombian and CSX™ carbon blacks available from Cabot, and PRINTEX™ 30 carbon black available from Degussa, ELFTEX S7100, MONARCH 470, MONARCH 570 and MONARCH 580 carbon blacks. Nonconductive carbon blacks are well known in the art and include RAVEN™ 1040 and RAVEN™ 1060 carbon black from Colombian.

The composition contains catalyst which catalyzes the reaction of isocyanate moieties with water or an active hydrogen containing compound, which are well known in the art, exemplary catalysts are organotin compounds, metal alkanoates, and tertiary amines, and mixtures thereof. A mixture of a tertiary amine, such as dimorpholino diethyl ether, and a metal alkanoate, such as bismuth octoate is preferred. Organotin compounds include alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin compounds preferably include a dialkyltin dicarboxylate or a dialkyltin dimercaptide. The preferred dialkyl dicarboxylates include 1,1-dimethyltin dilaurate, 1,1-dibutyltin diacetate and 1,1-dimethyl dimaleate. Preferred metal alkanoates include bismuth alkanoates, such as bismuth octoate or bismuth neodecanoate and zirconium alkanoates. The organo tin compound or metal alkanoate catalyst is present in an amount of about 60 parts per million or greater based on the weight of the adhesive, more preferably 120 parts by million or greater. The organo tin compound or metal alkanoate catalyst is present in an amount of about 1.0 percent or less based on the weight of the adhesive, more preferably 0.5 percent by weight or less and most preferably 0.1 percent by weight or less. Exemplary tertiary amine catalysts include dimorpholinodialkyl ether, a di((dialkylmorpholino)alkyl) ether, bis-(2-dimethylamino ethyl)ether, triethylene diamine, pentamethyldiethylene triamine, N,N-dimethyl cyclo hexyl amine, N,N-dimethyl piperazine 4-methoxyethyl morpholine, N-methyl morpholine, N-ethyl morpholine and mixtures thereof. A preferred dimorpholino dialkyl ether is dimorpholinodiethyl ether. A preferred di((dialkylmorpholino)alkyl) ether is (di-(2-(3,5-dimethylmorpholino) ethyl) ether). Tertiary amines are preferably employed in an amount, based on the weight of the adhesive of about 0.01 percent by weight or greater, more preferably about 0.5 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.0 percent by weight or less and most preferably about 0.4 percent by weight or less.

The adhesive may be formulated with fillers and additives known in the prior art for use in adhesive compositions. By the addition of such materials physical properties such as viscosity flow rates and the like can be modified. However, to prevent premature hydrolysis of the moisture sensitive groups of theisocyanate functional compounds, fillers should be thoroughly dried before admixture therewith. Exemplary fillers include clays. Preferred clays useful in the invention include kaolin, surface treated kaolin, calcined kaolin, aluminum silicates and surface treated anhydrous aluminum silicates. The clays can be used in any form, which facilitates formulation of a pumpable adhesive. Preferably, the clay is in the form of pulverized powder, spray-dried beads or finely ground particles. Clays may be used in an amount of about 10 percent by weight of the adhesive composition or greater, more preferably about 12 part by weight or greater and even more preferably about 18 percent by weight or greater. Preferably, the clays are used in an amount of about 30 percent by weight or less of the adhesive composition, more preferably about 28 percent by weight or less and most preferably about 24 percent by weight or less. Other components commonly used in adhesive compositions may be used in the composition of this invention. Such materials are well known to those skilled in the art and may include ultraviolet stabilizers and antioxidants and the like. As used herein all parts by weight relative to the components of the adhesive composition are based on 100 total parts by weight of the adhesive composition.

The composition may further comprise stabilizers, which function to protect the adhesive composition from moisture, thereby inhibiting advancement and preventing premature crosslinking of the isocyanates in the adhesive formulation. Stabilizers known to the skilled artisan for moisture curing adhesives may be used preferably herein. Included among such stabilizers are diethylmalonate, alkylphenol alkylates, paratoluene sulfonic isocyanates, benzoyl chloride and orthoalkyl formates. Such stabilizers are preferably used in an amount of about 0.1 parts by weight or greater based on the total weight of the adhesive composition, preferably about 0.5 parts by weight or greater and more preferably about 0.8 parts by weight or greater. Such stabilizers are used in an amount of about 5.0 parts by weight or less based on the weight of the adhesive composition, more preferably about 2.0 parts by weight or less and most preferably about 1.4 parts by weight or less.

The composition may further comprise an adhesion promoter or adhesion promoting component, such as those disclosed in Mahdi, U.S. Patent Publication 2002/0100550 paragraphs 0055 to 0065 and Hsieh, U.S. Pat. No. 6,015,475 column 5, line 27 to column 6, line 41 incorporated herein by reference. Preferably the adhesion promoter contains a silane present in some form. Preferable methods of including silane functionality in the compositions are disclosed in Wu et al., U.S. Pat. No. 6,512,033 at column 5, line 38 to column 7, line 27; U.S. Pat. Nos. 5,623,044; 4,374,237; 4,345,053 and 4,625,012, relevant portions incorporated herein by reference. The silane may be blended with the prepolymer. In some embodiments the has one or more active hydrogen atom which are reactive with an isocyanate. Preferably such silane is a mercapto-silane or an amino-silane and more preferably is a mercapto-trialkoxy-silane or an amino-trialkoxy silane. In some embodiments, the silanes having, active hydrogen atoms reactive with isocyanate moieties, can be reacted with the terminal isocyanate moieties of the prepolymer. Such reaction products are disclosed in U.S. Pat. Nos. 4,374,237 and 4,345,053 relevant parts incorporated herein by reference. In other embodiments, silanes having reactive hydrogen moieties reactive with isocyanate moieties can be reacted into the backbone of the prepolymer by reacting such silane with the starting materials during the preparation of the prepolymer. The process for the preparation of prepolymers containing silane in the backbone is disclosed in U.S. Pat. No. 4,625,012, relevant portions incorporated herein by reference. Such silane, having active hydrogen moieties, can be reacted with a polyisocyanate to form an adduct which is blended with the prepolymer reacted with a polyurethane prepolymer or reacted with a polyisocyanate and a compound having on average more than one moiety reactive with an isocyanate moiety. Preferably the adduct is a reaction product of a secondary amino- or mercapto-alkoxy silane and a polyisocyanate, the adduct having an average of at least one silane group and at least one isocyanate group per molecule (hereinafter "adduct"). Exemplary organofunctional silanes useful as adhesion promoters or to prepare adducts include amino- or mercapto-alkoxy silanes, isocyanate alkoxy silanes, methacryloxy silanes, epoxy alkoxy silanes, alkenyl alkoxy silanes and the like. Examples of such compounds include: N,N-bis[3-triethoxysilyl) propyl]amine; N,N-bis [(3-tripropoxy-silyl) propyl]amine; N-(3-trimethoxysilyl) propyl-3-[N-(3-trimethoxysilyl)-propyl amino]propionamide; N-(3-triethoxysilyl) propyl-3-[N-3-triethoxysilyl-propyl-amino]propionamide; N-(3-trimethoxysilyl)propyl-3-[N-3-triethoxysilyl)-propylamino]propionamide; 3-trimethoxysilylpropyl 3-[N-(3-trimeth-oxysilyl)-propylamino]-2-methyl propionate; 3-triethoxysilyl propyl 3-[N-(3-triethoxysilyl)-propylamino]-2-methyl propionate; 3-trimethoxysilylpropyl 3-[N-(3-triethoxysilyl)propyl amino]-2-methyl propionate; and the like. Preferably the organo functional silane is gamma-mercaptopropyl-trimethoxysilane (available as A189 from Union Carbide) or N,N'-bis((3-trimethoxysilyl)propyl)amine. The amount of adhesion promoter present is that amount which enhances the adhesion of the adhesive to the substrate surface. The amount of adhesion promoter present is preferably about 0.1 percent by weight or greater based on the weight of the adhesive and most preferably about 0.5 percent by weight or greater. The amount of adhesion promoter used is preferably about 10 percent by weight or less and most preferably about 2.0 percent by weight or less. The adhesion promoter can be located in either or both parts of a two part adhesive or in a one part adhesive.

The composition may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydroscopic materials are pyrolidinones such as 1 methyl-2-pyrolidinone, available from under the trademark M-Pyrol. The hydrophilic material is preferably present in an amount of about 0.1 parts by weight or greater and more preferably about 0.3 parts by weight or greater and preferably about 1.0 parts by weight or less and most preferably about 0.6 parts by weight or less. Optionally the adhesive composition may further comprise a thixotrope. Such thixotropes are well known to those skilled in the art and include alumina, limestone, talc, zinc oxides, sulfur oxides, calcium carbonate, perlite, slate flour, salt (NaCl), cyclodextrin and the like. The thixotrope may be added to the adhesive of composition in a sufficient amount to give the desired rheological properties. Preferably, the thixotrope is present in an amount of about 0 parts by weight or greater based on the weight of the adhesive composition, preferably about 1 part by weight or greater. Preferably, the optional thixotrope is present in an amount of about 10 parts by weight or less based on the weight of the adhesive composition and more preferably about 2 parts by weight or less.

The two part compositions may contain a curing agent located in the B side. Such curing agent comprises one of more compounds that contain greater than one isocyanate reactive group. The curing agents preferably contain hydroxyl groups. The curing agents can be one or more low molecular weight compounds or polyols. Polyols as described hereinbefore can be utilized as curing agents. One class of polyols can be prepolymers as described hereinbefore prepared utilizing excess equivalents of isocyanate reactive groups such that the resulting prepolymers contain isocyanate reactive groups, preferably hydroxyl. The one or more low molecular weight compounds have two or more isocyanate reactive groups and a hydrocarbon backbone wherein the backbone may further comprise one or more heteroatoms. Such low molecular weight compounds may be compounds known in the art as chain extenders, such compounds are difunctional, or crosslinkers, which have, on average, greater than two active hydrogen groups per compound. The heteroatoms in the backbone can be oxygen, sulfur, nitrogen or a mixture thereof, wherein oxygen, nitrogen or a mixture thereof is more preferred and oxygen most preferred. Preferably, the molecular weight of the low molecular weight compound is about 120 or less and more preferably about 100 or less. Preferably, the low molecular weight compound comprises one or more multifunctional alcohols, or one or more adducts of multifunctional alcohol and an alkylene oxide or a mixture thereof. Among preferred multifunctional alcohols are ethane diol, propane diol, butane diol, hexane diol, heptane diol, octane diol, glycerine, trimethylol propane, pentaerythritol, neopentyl glycol, and the like. Blends of various low molecular weight compounds may be used. The low molecular weight compound is used in a sufficient amount to obtain the desired G-Modulus (E-Modulus). In two-part compositions, the low molecular compound may be located in the resin side, the curative side or both. Preferably, the low molecular weight compound is located in the curative side. Preferably, the low molecular weight compound is present in the composition in an amount of about 2 percent by weight or greater, more preferably about 2.5 percent by weight or greater and most preferably about 3.0 percent by weight or greater. Preferably, the low molecular weight compound is present in the composition in an amount of about 10 percent by weight or less, more preferably about 8 percent by weight or less and most preferably about 6 percent by weight or less.

The composition or a part of the formulation may be formulated by blending the components together using means well known in the art. Generally, the components are blended in a suitable mixer. Such blending is preferably conducted in an inert atmosphere in the absence of oxygen and atmospheric moisture to prevent premature reaction. In embodiments where a polyester based isocyanate functional prepolymer is used, the adhesive compositions are blended at a temperature above the melting point of the polyester based isocyanate functional prepolymer and below a temperature at which significant side reactions occur. In this embodiment, the temperatures utilized are from about 40° C. to less than about 90° C., more preferably about 50° C. to about 70° C. It may be advantageous to add any plasticizers and/or a blend of one or more alkyl esters of alkenoates and one or more alkyl esters of alkanoates to the reaction mixture for preparing the isocyanate containing prepolymer so that such mixture may be easily mixed and handled. Alternatively, the plasticizers and/or a blend of one or more alkyl esters of alkenoates and one or more alkyl esters of alkanoates can be added during blending of all the components. Once the adhesive composition is formulated, it is packaged in a suitable container such that it is protected from atmospheric moisture and oxygen. Contact with atmospheric moisture and oxygen could result in premature crosslinking of the isocyanate functional prepolymer.

The composition is used to bond a variety of substrates together as described hereinbefore. The composition can be used to bond porous and nonporous substrates together. The adhesive composition is applied to a substrate and the adhesive on the first substrate is thereafter contacted with a second substrate. In preferred embodiments, the surfaces to which the adhesive is applied are cleaned and primed prior to application, see for example, U.S. Pat. Nos. 4,525,511; 3,707,521 and 3,779,794; relevant parts of all are incorporated herein by reference, generally the adhesives of the invention are applied at ambient temperature in the presence of atmospheric moisture. Exposure to atmospheric moisture is sufficient to result in curing of one part adhesive. Curing can be accelerated by the addition of additional water or by applying heat to the curing adhesive by means of convection heat, microwave, infrared or ultrasonic heating and the like. Preferably, the adhesive of the invention is formulated to provide a working time of about 6 minutes or greater more preferably about 10 minutes or greater. Preferably, the working time is about 15 minutes or less and more preferably about 12 minutes or less.

The composition may be used to bond glass or plastic coated with an abrasion resistant coatings, to other substrates such as metal or plastics. In a preferred embodiment, the first substrate is a glass, or plastic coated with an abrasion resistant coating, window and the second substrate is a window frame. In another preferred embodiment the first substrate is a glass, or plastic coated with an abrasion resistant coating, window and the second substrate is a window frame of an automobile. Preferably, the glass window is cleaned and has a glass primer applied to the area to which the adhesive is to be bonded. The plastic coated with an abrasion resistant coating can be any plastic which is clear, such as polycarbonate, acrylics, hydrogenated polystrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive.

In a preferred embodiment the composition of the invention is used to replace windows in structures or vehicles and most preferably in vehicles. The first step is removal of the previous window. This can be achieved by cutting the bead of the adhesive holding the old window in place and then removing the old window. Thereafter the new window is cleaned and primed. The old adhesive that is located on the window flange can be removed, although it is not necessary and in most cases it is left in place. The window flange is preferably primed with a paint primer. The adhesive is applied in a bead to the periphery of the window located such that it will contact the window flange when placed in the vehicle. The window with the adhesive located thereon is then placed into the flange with the adhesive located between the window and the flange. The adhesive bead is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure. In use, the components of two-part compositions are blended as would normally be done when working with such materials. For a two-part compositions to be most easily used in commercial and industrial environments, the volume ratio at which the two parts are combined should be a convenient whole number. This facilitates application of the curable composition with conventional, commercially available dispensers including static and dynamic mixing. Such dispensers with static mixing are shown in U.S. Pat. Nos. 4,538,920 and 5,082,147 (incorporated herein by reference) and are available from Conprotec, Inc. (Salem, N.J.) under the trade name MIXPAC or SULZER™ QUADRO of Sulzer Ltd., Switzerland. Typically, these dispensers use a pair of tubular receptacles arranged side-by-side with each tube being intended to receive one of the two parts of the polymerizable composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended polymerizable composition is extruded from the mixing chamber onto a substrate. When using electrically-driven equipment, dynamic mixing may be used. Once the tubes have been emptied, they can be replaced with fresh tubes and the application process continued. The volumetric ratio at which the two parts of the polymerizable composition are combined is controlled by the diameter of the tubes. (Each plunger is sized to be received within a tube of fixed diameter, and the plungers are advanced into the tubes at the same speed.) A single dispenser is often intended for use with a variety of different two-part polymerizable compositions and the plungers are sized to deliver the two parts of the polymerizable composition at a convenient mix ratio. Alternatively the two part composition may be disposed in a single tube with the curative part located in a bag within the resin. In this embodiment a single tube is used and when the two parts are extruded from the tube they are passed through a nozzle containing mixing elements so as to mix the components sufficiently such that the composition can undergo cure once mixed. Some common mix ratios are 1:1, 2:1, 4:1 and 10:1 and can also be odd ratios. Preferably, the two parts are blended at a mix ratio of about 1:1.

Preferably, the mixed two-part compositions of the invention have a suitable viscosity to allow application without dripping. Preferably, the viscosities of the two individual components should be of the same order of magnitude. For lower viscosities, the components may require gelling agent known in the art to prevent sag of the uncured adhesive system. Two-part adhesive compositions start to cure upon mixing the two parts. Curing can be accelerated by applying heat to the curing adhesive by means of infrared heat, induction heat, convection heat, microwave heating, application of ultrasonic vibration and the like.

In another embodiment the compositions of the invention can be used to bond modular components to a car body or to each other. Examples of modular components include vehicle modules, such as door, window or body. Molecular weights as described herein are number average molecular weights which may be determined by Gel Permeation Chromatography (also referred to as GPC). For polyurethane prepolymers, it is also possible to calculate approximate number average molecular weight from the equivalent ratio of the isocyanate compounds and of the polyol compounds with which they are reacted as known to the persons skilled in the art. Viscosities as described herein are determined according to the procedure disclosed in Bhat, U.S. Pat. No. 5,922,809 at column 12, lines 38 to 49, incorporated herein by reference. In reference to polyurethane prepolymers, average isocyanate functionality is determined according to the procedure disclosed in Bhat, U.S. Pat. No. 5,922,809 at column 12 lines 65 to column 13, line 26, incorporated herein by reference.

ILLUSTRATIVE EMBODIMENTS OF THE INVENTION

The following examples are provided to illustrate the invention, but are not intended to limit the scope thereof. All parts and percentages are by weight, unless otherwise indicated.

Preparation of Prepolymers

Prepolymers are prepared according to a procedure similar to the following procedure using the compositions listed in Table 1. A polyether polyurethane prepolymer is prepared by thoroughly mixing 27.11 grams of a polyoxypropylene diol (VORANOL™ 220-056 polyol having an average molecular weight of 2000), 26.77 grams of polyoxypropylene triol (VORANOL™ 232-236 polyol having an average molecular weight of 4500 VORANOL™ is a trademark of The Dow Chemical Company) or TPE 4542 triol from BASF, and 30.224 grams of alkyl phthalate plasticizer (or other plasticizer as shown herein) in a 2-liter resin kettle equipped with a mechanical agitator, a nitrogen inlet adapter and a thermometer. Under nitrogen purge, the mixture is heated to 54° C., 9.58 grams of molten diphenylene methane 4,4' diisocyanate are added to the mixture and thoroughly mixed. Then 0.004 grams of tin di(octoate) are introduced and the mixture is mixed for one hour. 0.42 grams of diethyl malonate are added to the mixture which was then mixed for 15 minutes. Thereafter, 0.812 grams of bis-(3-trimethoxysilylpropyl)amine is added and the mixture is mixed for two hours. Then 5.02 grams of DESMODUR™ N-3300 (an aliphatic polyisocyanate resin based on hexamethylene diisocyanate, supplied by Bayer USA Inc.) are added and the mixture is mixed for 15 minutes.

TABLE 1

| Ingredient | Ex 1 g | Ex 2 g | Ex 3 g |
|---|---|---|---|
| Di-isononyl phthalate | 30.224 | 30.224 | 0 |
| Methyl ester of fatty acid mixture derived from Soy oil | 0 | 0 | 30.224 |
| Methylene diphenyl di-isocyanate | 9.58 | 9.58 | 9.58 |
| Diethyl malonate | 0.42 | 0.42 | 0.42 |
| Polyol V-232-036N | 0 | 26.77 | 26.77 |
| TPE 725 | 26.77 | 0 | 0 |
| V-220 056N | 27.11 | 27.11 | 27.11 |
| aliphatic polyisocyanate based on hexamethylene diisocyanate | 5.08 | 5.08 | 5.08 |
| Gamma-methacryloxypropyl trimethoxy silane | 0.812 | 0.812 | 0.812 |
| Tin di (octoanate) | 0.004 | 0.004 | 0.004 |

Compounding of Adhesives

All of the adhesives are made according to the following compounding procedure using the raw material percentages listed in Table 2. The only change between the different formulations is the compounding temperature. The adhesives are compounded at room temperature. The appropriate amounts of polyether prepolymer are charged to the vessel and degassed under vacuum for 15 minutes. The carbon black and clay fillers are added and mixed for five minutes at slow speed under vacuum until the fillers are sufficiently wetted by the prepolymers. The mixing speed is increased and the fillers dispersed for 20 minutes. Finally, the dimorpholino diethyl ether, phosphite and adhesion promoter and the are added to the mixing vessel and the mixture is mixed under vacuum for an additional 10 minutes.

Table 2 describes the formulations tested and the results are compiled in Table 3

TABLE 2

| Ingredients | Ex 4% | Ex 5% | Ex 6% |
|---|---|---|---|
| Prepolymer Example 1 | 61.94 | | |
| Prepolymer Example 2 | | 61.94 | |
| Prepolymer Example 3 | | | 61.94 |
| Clay | 11.23 | 11.23 | 11.23 |
| TNPP | 0.5 | 0.5 | 0.5 |
| Methyl ester of fatty acid mixture derived from Soy oil | none | none | From Prepolymer |
| Di-isononyl phthalate | 2.98 | 2.98 | 2.98 |

TABLE 2-continued

| Ingredients | Ex 4% | Ex 5% | Ex 6% |
|---|---|---|---|
| Carbon black | 23 | 23 | 23 |
| Dimorpholinodiethylether | 0.35 | 0.35 | 0.35 |
| Total | 100 | 100 | 100 |

Testing Procedures—Press Flow Viscosity: The press flow viscosity is determined as the time (seconds) required to extrude 20 grams of adhesive through a capillary. The width of the capillary is fixed at 0.203 in (5.1 mm) and the applied pressure is 80 psi ($5.5 \times 10^5$ Pa). Unless otherwise noted, all press flow viscosity values were determined at 23+/−1° C.

Stringing Test: The stringing test is conducted by dispensing the adhesive with a high speed battery powered caulking gun. After dispensing approximately six inches of an 8 mm by 12 mm isosceles triangle shaped bead the dispensing tip is immediate pulled away from the adhesive bead in a motion parallel to and in the same plane as the adhesive bead. The stringing is measured by the length of the tail, in mm, that is left upon separation.

TABLE 3

| Test | Ex 4 | Ex 5 | Ex 6 |
|---|---|---|---|
| Press Flow Initial Seconds 80 psi .0.157 in | 39.5 | 40 | 9.5 |
| Press Flow 3 days 54° C. Seconds 80 psi .0.157 in | 47.5 | 57.5 | 18.5 |
| Sag Initial mm | 0 | 0 | 0 |
| Sag 3 days 54° C. mm | 0 | 0 | 0 |
| Yield Stress Initial Units | 7987 | 8203 | 6907 |
| Yield Stress 3 days 54° C. Units | 9287 | 9663 | 9410 |
| AR-2000 G' Initial (Pa) | 1.60E06 | 1.63E06 | 1.38E06 |
| AR-2000 G' 3 day 54° C. (Pa) | 1.58E06 | 1.54E06 | 1.350E06 |
| String mm | 23.1 | 30.25 | 9.43 |
| Shear Creep RT mm | 1.56 | 3.36 | 4.31 |
| Shear Creep 40° C. mm | 2.07 | 2.05 | 9.83 |
| Decking Force RT lbf | 9.14 | 9.22 | 6.51 |
| Decking Force 40° C. lbf | 8.14 | 7.45 | 7.41 |
| Decking Force 0° C. lbf | 9.57 | 9.52 | 8.78 |

Examples 7 to 10 are prepared using the above described processes wherein the prepolymer contains different plasticizing compounds. The adhesive compositions are described in Table 4.

TABLE 4

| | Example | | | |
|---|---|---|---|---|
| | 7 (g) | 8 (g) | 9 (g) | 10 (g) |
| Prepolymer containing about 30 percent of Diisononyl phthalate | 1238.8 | | | |
| Prepolymer containing about 30 percent of Soy based mixture of methyl alkenoates and methyl alkanoates 1 | | 1238.8 | | |
| Prepolymer containing about 30 percent of Soy based mixture of methyl alkenoates and methyl alkanoates 2 | | | 1238.8 | |
| Prepolymer containing about 30 precent of Canola based mixture of methyl alkenoates and methyl alkanoates | | | | 1238.8 |
| Clay | 224.6 | 224.6 | 224.6 | 224.6 |
| Trinonyl phenyl phosphate | 10 | 10 | 10 | 10 |
| Diisononyl phthalate | 59.6 | 59.6 | 59.6 | 59.6 |
| Carbon Black | 460 | 460 | 460 | 460 |
| dimorpholinodiethylether | 7 | 7 | 7 | 7 |
| Total | 2000 | 2000 | 2000 | 2000 |

The prepolymer with the various plasticizer compositions are prepared as described hereinbefore.

The properties of adhesives of examples 7 to 10 are contained in Table 5.

TABLE 5

| | Example | | | |
|---|---|---|---|---|
| Test | 7 | 8 | 9 | 10 |
| Press Flow Initial (80 psi/0.157 in) (seconds) | 48.5 | 24 | 22 | 21 |
| Press Flow 3 day at 54° C. (seconds) | 65 | 52.5 | 40 | 52 |
| Sag Initial mm | 0 | 0 | 0 | 0 |
| Sag 3 day at 54° C. mm | 0 | 0 | 0 | 0 |
| G' Initial Pa | 7.33 | 5.10 | 7.66 | 5.45 |
| G' 3 day at 54° C. Pa (E+05) | 8.48 | 8.92 | 8.19 | 6.74 |
| Sheer Creep at RT mm | 3.28 | 4.08 | 6.56 | 8.83 |
| Sheer Creep at 40° C. mm | 4.44 | 3.83 | 6.31 | 10.5 |
| Decking Force RT lbf | 11.30 | 12.18 | 12.60 | 10.82 |
| Decking Force at 40° C. lbf | 8.67 | 6.91 | 10.61 | 8.10 |
| Decking Force at 0° C. lbf | 9.52 | 10.00 | 9.01 | 8.67 |

Results are averages of 2 or 3 individual runs.

This data illustrates the 1:1 weight substitution of diisononyl phthalate with soy methyl ester or canola methyl esters, specifically SoyGold 1000, Columbus 970 (soy 2), and Columbus (Canola) 973 perform similarly with notable exceptions. Initial adhesive viscosities are significantly lower with the vegetable oils, based on their much lower inherent viscosities but the G modulus is nearly identical and remains high after aging. This is advantageous in adhesive formulations that require low dispense pressures but high gap filling, sag resistance and green strength. The molecular weight distribution for all of the samples is comparable before and after aging; indicating no thermal degradation or side reactions are taking place. The initial and heat aged isocyante content are good measures of the completion of reaction and indicate no unexpected reactions occurred.

What is claimed is:

1. A composition comprising: a) one or more isocyanate functional components comprising an isocyanate functional prepolymer prepared by the reaction of an isocyanate functional compound with one or more compounds having on average more than one isocyanate reactive functional group; b) a blend of one or more $C_{1-8}$ alkyl esters of $C_{10-20}$ alkenoates wherein the total carbon atoms of the alkenoates is from 11 to 22, and one or more $C_{1-8}$ alkyl esters of $C_{10-20}$ alkanoates wherein the total carbon atoms of the alkenoates is from 11 to 22; c) one or more catalysts for the reaction of isocyanate moieties with hydroxyl groups; and one or more of i) an adhesion promoter containing a silane, ii) one or more isocyanate functional polyester based prepolymers which are solid at 23° C., or iii) one or more polyisocyanates having a nominal functionality of about 3 or greater; wherein the composition is a one part composition useful as an adhesive.

2. A composition according to claim 1 wherein the C alkyl esters of alkenoates exhibit a melting point of about −10° C.

or less and one or more alkyl esters of alkanoates exhibit a melting point of about 30° C. or greater.

3. A composition according to claim 1 wherein the blend exhibits a dielectric constant of 6.5 or greater, a boiling point of 200° C. or greater, a viscosity of about 40 centpoise or less at 25° C. and a vapor pressure of about 1 MPa or less at 25° C.

4. A composition according to claim 1 wherein the blend b) comprises from about 70 to about 90 percent by weight of one or more alkyl esters of alkenoates and from about 5 to about 15 percent by weight of one or more alkyl esters of alkanoates based on the weight of the blend b).

5. A composition according to claim 1 which further comprises one or more reinforcing fillers.

6. A composition according to claim 1 wherein the blend of one or more alkyl esters of alkenoates and one or more alkyl esters of alkanoates are derived from one or more natural oils.

7. A composition according to claim 1 wherein the blend of one or more alkyl esters of alkenoates and one or more alkyl esters of alkanoates are derived from one or more natural oils selected from the group comprising soy, sunflower, safflower, rapeseed and cottonseed oils.

8. A composition according to claim 1 wherein the blend of one or more alkyl esters of alkenoates and one or more alkyl esters of alkanoates are present in an amount of about 5 to about 40 percent by weight of the composition.

9. A composition according to claim 5 wherein the reinforcing fillers contain one or more conductive carbon blacks in an amount of about 20 percent by weight or less.

10. A composition according to claim 5 wherein
a) the one or more isocyanate functional components are present in an amount of about 20 to about 60 percent by weight; b) the blend of one or more alkyl esters of alkenoates and one or more alkyl esters of alkanoates are present in an amount of about 5 to about 40 percent by weight; c) one or more catalysts for the reaction of isocyanate moieties with hydroxyl groups are present in an amount of about 0.005 to about 2 percent by weight and d) one or more reinforcing fillers are present in an amount of about 10 to about 35 percent by weight; wherein percentages are based on the weight of the composition.

11. A composition according to claim 1 comprising one or more $C_{1-4}$ alkyl esters of $C_{14-20}$ alkenoates comprising both mon-enes and di-enes and one or more $C_{1-4}$ alkyl esters of $C_{14-20}$ alkanoates.

12. A composition according to claim 1 wherein the blend b) comprises one or more $C_{1-2}$ alkyl esters of $C_{16-20}$ alkenoates comprising both mon-enes and di-enes and one or more $C_{1-2}$ alkyl esters of $C_{16-20}$ alkanoates.

13. A method of bonding two or more substrates together which comprises contacting the two or more substrates together with a composition according to claim 1 disposed along at least a portion of the area wherein the substrates are in contact.

14. The method of claim 13 wherein the at least one of the substrates is window glass.

15. A method according to claim 13 wherein at least one of the other substrates is a building or a vehicle.

16. The method according to claim 13 wherein the substrate is a vehicle.

17. A method of replacing a window of a vehicle comprising: i) removing the window from the vehicle; ii) applying a composition according to claim 1 to a replacement window or to the flange of the vehicle adapted to hold the window into the vehicle; iii) contacting the flange of the vehicle and the replacement window with the composition disposed between the replacement window and the flange of the vehicle; and iv) allowing the adhesive to cure.

18. The method of claim 17 wherein the vehicle can be safely driven after 60 minutes from installation of the window into the vehicle.

19. A composition according to claim 1 wherein the adhesion promoter is present in the composition and is a mercapto-silane or amino silane.

20. A composition according to claim 1 wherein the composition further comprises a moisture stabilizer which is selected from the group comprising diethylmalonate, alkylphenol alkylates, paratoluene sulfonic isocyanates, benzoyl chloride and orthoalkyl formates.

* * * * *